Oct. 5, 1965 R. A. HUDSON ETAL 3,210,086
SHAFT SEAL
Filed March 27, 1963
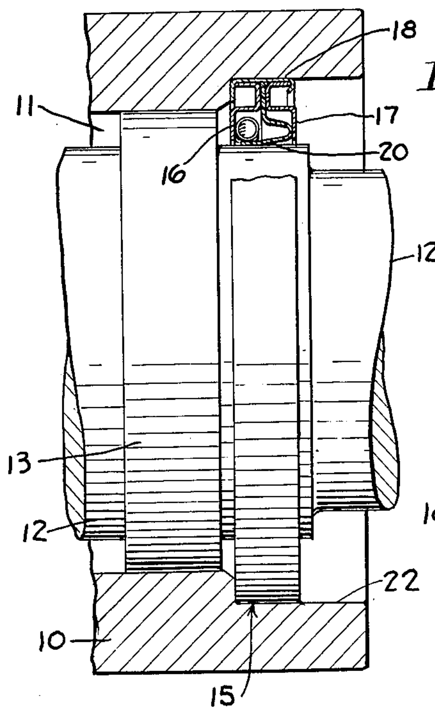
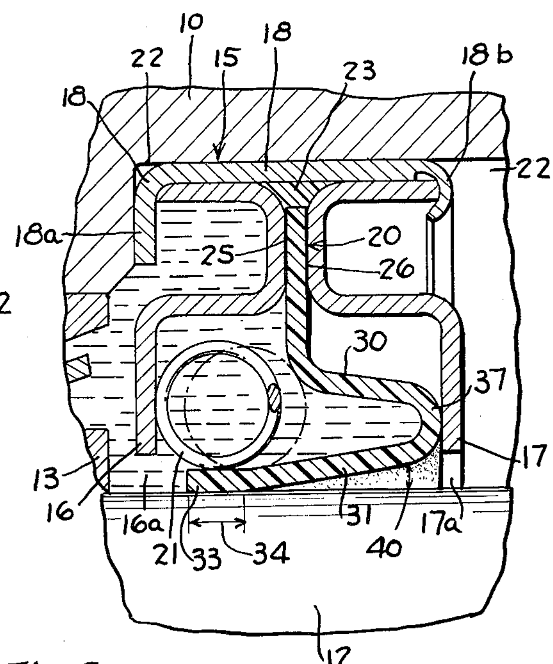
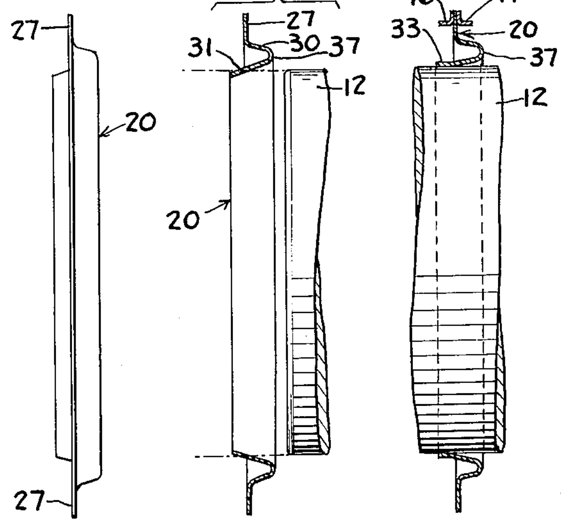
INVENTORS
RAYMOND A. HUDSON
& DAVID L. WALCHLE
BY
Gregory S. Dolgorukov
ATTORNEY United States Patent Office 3,210,086
Patented Oct. 5, 1965

3,210,086
SHAFT SEAL

Raymond A. Hudson, Ann Arbor, and David L. Walchle, Milan, Mich., assignors to The Mather Company, Toledo, Ohio, a corporation of Ohio Filed Mar. 27, 1963, Ser. No. 268,225
5 Claims. (Cl. 277—51)

This invention relates to seals for liquids, such as oil, to prevent leakage thereof from liquid containing chambers around shafts and other movable or rotatable members passing through the walls of said chambers.

The number of applications requiring such seals, and particularly oil seals, are constantly increasing, and the operation requirements, particularly with respect to temperatures, pressures, and rotative speeds of the sealed shafts are becoming more and more severe. Similarly increasing are the number of failures of such seals, such as oil seals or seals intended to seal lubricating oil within the oil containing chambers of devices such as transmissions, differentials, and other devices.

While it appeared paradoxical at the outset, it is appreciated now that the main cause of the failure of oil seals lies in the lack of proper lubrication of the surfaces in sliding contact. This results from the fact that the sealing function of the oil seal and the lubricating function thereof operate against each other. In other words, the more perfect is the seal, the more probable is the failure of the sealing member for lack of lubrication. Inversely, leakage around a seal ensures proper lubrication and greatly decreases the probability of failure of such a seal. However, many devices containing oil sealed therein have to operate for long periods of time and, therefore, even slight leakage through the oil seals thereof would cause loss of oil or other operating liquid therefrom and failure of the device. Thus, even slight leakage through the seal of such devices is objectionable. The friction between the surfaces in sliding contact, such as the surfaces of the rotating shafts and surfaces of the sealing elements, may be considerable. It may not only cause wear and failure of the seal but it often produces "grooving" of shafts even those made of hard metals. The latter phenomena indicates that direct contact with the metal caused by absence of oil between the rubbing surfaces is taking place.

One of the objects of the present invention is to provide an improved seal for liquids for preventing leakage of such liquids around shafts and other movable members, whereby the above difficulties and disadvantages are overcome and largely eliminated, thus increasing effectiveness and life of such seals as well as those of devices including such seals, and preventing sudden and unexpected failures thereof.

Another object of the present invention is to provide an improved oil seal having improved sliding contact between the sealing member and the sealed member.

A still further object of the present invention is to provide an improved seal in which the unit pressure between the surfaces in sliding contact is so controlled as to be sufficient to effect a proper seal but is not so high as to produce wear of the seal or grooving of the shaft.

A still further object of the invention is to provide an improved oil seal in which the area of the surfaces in sliding or sealing contact is substantially increased as compared with conventional seals, with the unit pressure between said surfaces being produced by a variety of pressure creating means which can be so arranged or controlled as to produce light but effective sealing pressure between the sliding surfaces.

A still further object of the present invention is to provide an oil seal having self-lubricating characteristics.

A still further object of the present invention is to provide an improved oil seal having an annular sealing diaphragm which is so constructed that an increase in oil pressure within the sealed chamber increases the sealing function of the diaphragm as well as the area of its contact with the movable member, such as a rotating shaft, without otherwise distorting the shape of the diaphragm in a manner causing interference with sealing function of the diaphragm.

Further objects and advantages of this invention will be apparent from the following description and appended claims, reference being had to the accompanying drawings forming a part of this specification, wherein like reference characters designate corresponding parts in the several views.

FIG. 1 is an elevational view partly in section showing a seal embodying the present invention installed for sealing a rotatable shaft.

FIG. 2 is a fragmentary sectional view showing on a larger scale the upper portion of the seal appearing in section in FIG. 1.

FIG. 3 is a side view showing the sealing diaphragm used in our improved oil seal separately and before the sealing diaphragm is assembled within the seal.

FIG. 4 shows the sealing diaphragm of FIG. 3 in section, with the shaft about to be inserted therethrough.

FIG. 5 shows the diaphragm of FIGS. 3 and 4 with the shaft passed therethrough and stretching the edges of the seal at the central opening thereof to produce a sealing lip or hoop portion.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Referring to the drawings, there is shown therein, by way of example, an oil seal embodying the present invention. FIGS. 1 and 2 of the drawings illustrate the seal installed in place in a nest provided in the walls 10 of an oil chamber 11 in which there is operatively arranged a shaft 12, one portion of which protrudes outwardly from said chamber. The shaft 12 is operatively mounted in a bearing 13 which may be of any suitable construction. The bearing 13 operates in oil and has oil on both of its sides. A seal, generally indicated by the numeral 15, is mounted on the wall 10 on the right hand side of the bearing 13 to seal the oil and prevent its leakage out of the chamber 11, both between stationary surfaces as well as surfaces in sliding contact.

The seal comprises two annular members 16 and 17 which may be made of sheet metal by stamping operations. Said members may be identical in construction, with one of them being reversed and placed against the other to form an annular space or pinching groove therebetween. An annular sealing diaphragm, generally indicated by the numeral 20, is held between said members 16 and 17. An outer case 18 embraces the members 16 and 17 with a flange **18*a* forming a stop, while the flange 18*b* which is turned down prior to assembly to have a thinned out edge is rolled in after the members 16 and 17, the diaphragm 20, and the garter spring 21 are assembled within the case 18. The members 16 and 17 are provided with central openings 16*a* and 17*a* which are of a larger diameter than the shaft 12 passing therethrough. The seal is pressed fit into the nest 22 against the shoulder thereof, as is best shown in FIG. 2. The finish of the inner walls within said nest as well as the finish of the outer surfaces of the outer case 18** is such that when the seal is pressed fit into the nest, no leakage can take place between the walls of the nest and the outer surfaces of the outer case 18.

In order to prevent leakage between the inner surfaces of the member 18 and the outer peripheral surfaces of the members 16 and 17, the outside diameter of the diaphragm 20 is made smaller than the inside diameter of the case 18 in order to provide a clearance space therein, which space is filled with a suitable resin cast into such clearance space, as shown at 23, to interrupt and seal the path between said metal surfaces. We prefer to use for sealing an epoxy bonding agent, which agent also operates to bond the diaphragm to the surfaces of the members 16 and 17 as indicated in FIG. 2 by heavy lines 25 and 26. Making the sealing diaphragm 20 of a smaller outside diameter than the inside diameter of the member 18 has an additional advantage of making a diaphragm of a certain outside diameter suitable for use in seals of various outside diameters. By virtue of the construction so far described, the oil is sealed at all metal to metal or stationary contact surfaces as well as at surfaces of the diaphragm, in sliding contact with metal surfaces of the shaft.

Lacking sealing means in the form of an annular diaphragm 20, the oil would leak from the chamber 11 through the clearance spaces 16*a* and 17*a*, see FIG. 2, i.e., around the shaft 12. The function of the sealing diaphragm 20 to to prevent such leakage.

The sealing diaphragm 20 is made of a resilient material capable of retaining within the limits of its resiliency the shape imparted thereto. The seal 20, illustrated separately in FIGS. 3–5, has a cross section providing an outer peripheral or flange portion 27, the outer edges whereof are pinched and held between the members 16 and 17, as explained, while the inner edges thereof merge smoothly and seamlessly into the shorter leg 30 of a U-shaped convolution, the longer leg 31 whereof extends in the direction of the oil chamber 11 and contacts the shaft 12.

The inside diameter of the diaphragm 20 at the central opening thereof is smaller than the outside diameter of the shaft 12 as is best shown in FIG. 4. In consequence thereof, when the shaft 12 is passed through the inner opening of the diaphragm 20, it stretches the edge portion of the diaphragm at said opening, thus forming a sealing hoop or lip portion 33 contacting the shaft along an appreciable portion of its length and thus providing a sealing surface around the shaft of the width designated by the numeral 34. The garter spring 21 embraces the sealing lip or hoop portion 33 exerting thereon pressure determined by the tension of the spring. The connecting portion 37 of the U-shaped convolution in a normal or unstrained condition of the diaphragm 20 bears against the wall of the member 17, thus affording support to the diaphragm.

By virtue of the construction described above, the spring 21 is always in position on the sealing hoop section 33. In one extreme position of the spring 21 it bears against the wall of the member 16 and, therefore, cannot roll off or come undesirably close to the edge of the diaphragm 20. In an unstrained condition of the diaphragm 20, should spring 21 roll into the position thereof indicated by the phantom lines in FIG. 2, it would contact the place of juncture between the peripheral or flange portion 27 and the shorter leg 30 of the convolution. Such movement of the spring 21 does not affect its pressure on the lip portion 33. Pressure which may exist within the oil chamber 11 operates to press the sealing lip 33 against the shaft, thus improving sealing thereof. Increase of such pressure would expand the legs 30 and 31 of the U-shaped convolution outwardly in a certain degree. However, due to the form of the diaphragm and support thereof by the wall 17, the diaphragm would resist excessive distortion of its form. The slight movement of the diaphragm and its sealing lip 33 produced by such distortion of the diaphragm or due to movements of the garter spring 21 operates to move the lip 33 on the shaft and to vary the unit pressure at various portions of the lip, thus admitting the oil between the contact surfaces in minimum amounts necessary for lubrication but not sufficient to cause leakage. Because of the body resiliency of the diaphragm 20 due to the provision of the convolution therein, any "run out" of the shaft, i.e., eccentricity in its operation, is compensated for by flexing of the convolution.

The diaphragm 20 of our improved seal may be made of a number of resilient materials, such as neoprene rubber or plastics. We prefer to use tetrafluoroethylene resin material with or without addition of fillers. Such material may be cast into the shape of a thick wall tube, which may be sliced in a suitable machine to produce washers of desired thickness. Thereupon the washers are formed in a suitable die or in some other manner to impart to them the form illustrated in FIGS. 3 and 4. Tetrafluoroethylene resin has exceedingly small coefficient of friction not only in contact with metals but also with itself.

By virtue of the construction disclosed above the shaft need not be machined to close tolerances or to a high finish. Resiliency of the convolution will also compensate for the difference in the variations of the diameter of the shaft. While initial wear of the seal will cause the resin to fill the pockets present in the surface of the shaft, thereupon rubbing of the resin seal against the resin pockets would produce exceedingly smooth and friction-free surfaces possessing self-lubricating properties and ensuring an exceedingly effective seal capable of operating for long periods of time without appreciable wear.

The angle 40 which the leg 31 makes with the surface of the shaft may be from 5°–10° with the resin specified above. Different materials, such as rubber, require different angles which are best determined experimentally. Sensitivity of the seal to changes in the angle is different depending on the material of the diaphragm, and some experimentation is advisable with the use of various materials, or with the use of the same material but of different hardness which may be desirable with seals of various dimensions.

We claim:

1. A sealing device for a rotatable shaft passing through an aperture in a wall having liquid on one of its sides, with said device intended to prevent passage of the liquid to the other side of the wall through said aperture both between stationary contacting surfaces as well as between surfaces in sliding contact, said sealing device comprising a metal case sealingly fitted into said aperture, said casing sealing the liquid at the wall surfaces of said aperture and providing a peripheral pinching groove, a seal member of the diaphragm type having its outer peripheray pinched in part of said groove by said casing, the remaining part of said groove containing a resin to insure fluid tight seal of said diaphragm seal member in said groove, the opening in the center of said diaphragm being of a smaller diameter than said shaft, in order to have the edges of said diaphragm at said opening stretched in the process of passing the shaft through the opening to provide on said diaphragm a hoop portion contacting the shaft through an appreciable portion of the length thereof.

2. A sealing device defined in claim 1, and including an annular spring means housed within said case and bearing resiliently on said hoop portion to enhance the sealing function thereof, said means being restrained by said case and said diaphragm to movements along the shaft through a distance smaller than the width of said hoop portion of the diaphragm.

3. The sealing device defined in claim 1 with the sealing diaphragm being made of tetrafluoroethylene resin base material and having cross-section providing a peripheral portion extending in a plane substantially perpendicular to the axis of the diaphragm, with the inner edges of said portion merging smoothly and seamlessly into one leg of a U-shaped convolution having two legs directed toward the oil chamber, with the other leg thereof being longer than said first leg and having said hoop portion on its free end.

4. A fluid seal between an opening in a wall and a shaft projecting through said opening, said seal comprising:

(1) an annular casing having
  (a) a peripheral portion sealed in said opening in said wall,
  (b) a pair of inwardly spaced parallel flanges substantially bridging the annular space between said wall and said shaft, and
  (c) a central groove between and axially spaced from the inner radial edges of both said flanges, (2) an annular sealing diaphragm having
  (a) a peripheral edge sealed in said groove,
  (b) an inner edge of a diameter less than that of said shaft to be stretched into a cylindrical shaft contacting surface by said shaft in the direction of said fluid side of said wall, which fluid is to be retained by said seal, and
  (c) an annular ridge in said diaphragm extending axially away from said fluid side of said wall and between said peripheral and inner edges of said diaphragm and being retained by one of said parallel flanges, and (3) resin means in said groove for sealing said peripheral edge of said diaphragm, and (4) a garter spring in said casing being retained by the other one of said parallel flanges and urging said cylindrical shaft contacting surface of said diaphragm against said shaft.

5. The sealing device defined in claim 4, with the sealing diaphragm being made of tetrafluoroethylene resin.

References Cited by the Examiner

UNITED STATES PATENTS

| | | | |
|---|---|---|---|
| 1,068,329 | 7/13 | Derihon | 277—152 X |
| 2,012,974 | 9/35 | Penniman | 277—152 X |
| 2,743,119 | 4/56 | Covert et al. | 277—170 |
| 2,750,212 | 6/56 | Skinner | 277—35 |
| 2,893,770 | 7/59 | Poncet | 277—182 |
| 3,072,413 | 1/63 | Parks | 277—8 |

FOREIGN PATENTS

| | | |
|---|---|---|
| 462,351 | 3/37 | Great Britain. |

LEWIS J. LENNY, *Primary Examiner.*

SAMUEL ROTHBERG, *Examiner.*